United States Patent

[11] 3,619,780

[72] Inventors Bas Hoeks
Palo Alto;
Paul E. Stoft, Menlo Park, Calif.; Nobuo Numasaki; Haruo Ito; Takayuki Sato, Tokyo, Japan; Knud Knudsen, Los Altos Hills, Calif.
[21] Appl. No. 168
[22] Filed Jan. 2, 1970
[45] Patented Nov. 9, 1971
[73] Assignee Hewlett-Packard Company
Palo Alto, Calif.
[32] Priority Jan. 24, 1969
[33] Japan
[31] 44/04813

[54] TRANSISTOR NOISE MEASURING APPARATUS
2 Claims, 12 Drawing Figs.
[52] U.S. Cl. .................................................. 324/158 T,
324/57 N
[51] Int. Cl. ....................................................... G01r 31/22,
G01r 27/00
[50] Field of Search ............................................ 324/158 T,
57, 57 N, 57 DE; 325/363

[56] References Cited
UNITED STATES PATENTS
2,143,094  1/1939  Swift ........................... 325/363 X
3,302,116  1/1967  Free ............................ 325/363
3,182,254  5/1965  Feldman et al. ............. 324/57

Primary Examiner—Rudolph V. Rolinec
Assistant Examiner—Ernest F. Karlsen
Attorney—A. C. Smith ABSTRACT: An improved instrument measures noise power generated by a transistor under selected test conditions. Automatic adjustment of gain from the input of the transistor under test through succeeding stages provides an accurate readout of noise generated within the transistor under test.

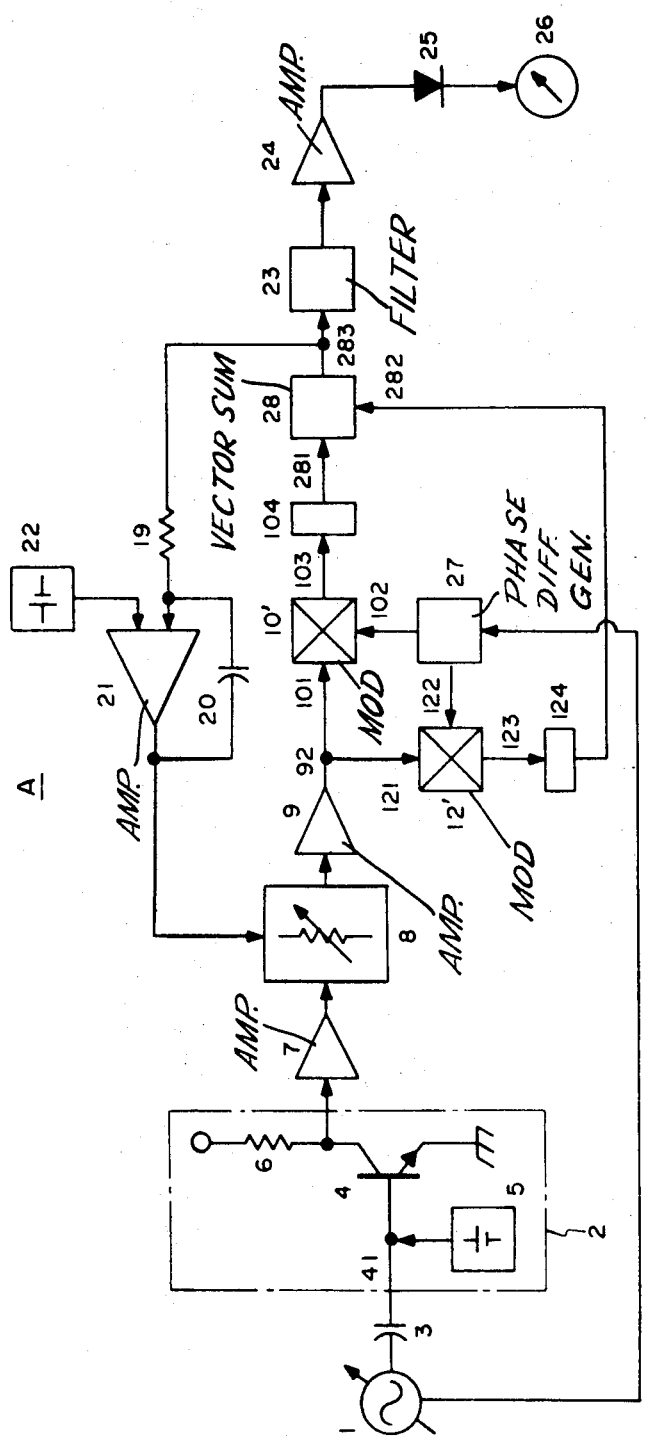
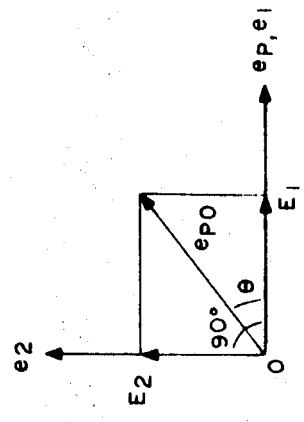
FIG. 2
FIG. 6

3,619,780

TRANSISTOR NOISE MEASURING APPARATUS

BACKGROUND OF THE INVENTION

One known noise-measuring technique is a signal source connected to the input terminals of the transistor under test. The source has a specified source impedance and is tuned to the frequency at which the noise measurement is to be performed. The signal appearing at the output of the transistor circuit is applied to a first amplifier including a variable attenuator, then to a second variable attenuator, to a selective amplifier that is tuned to the frequency of the signal source, then to a square-law detector, to a smoothing circuit and then to an indicating meter. The second variable attenuator is to be adjusted so that the output meter readings are equal for two conditions, i.e. (1) when the signal from the source is not present (maintaining the specified source impedance and setting the second variable attenuator to known value), and (2) when the input signal of a constant level is applied to the transistor circuit from the signal source. The noise quantity is then obtained from the attenuation quantity indicated by the second attenuator, and from the signal level and the noise bandwidth of said selective amplifier. With this method, the drawbacks are that (1) each time a change in measuring frequency is desired both the center frequency of the selective amplifier and the frequency of the signal source must be changed; and (2) two readings, an adjustment of the second variable attenuator to make these two readings equal and calculation are necessary to obtain one measurement.

SUMMARY OF THE INVENTION

The present invention provides apparatus which is equipped with means of automatically adjusting gains from the input of transistor circuit to the output of the first amplifier, and whose measuring operations are simple. And under the present invention it is possible to provide an apparatus which selects the frequency components adjacent to selective frequencies of pilot signals out of the signal components included in the transistor noise, and exhibit them in an indicator for direct reading.

DESCRIPTION OF THE DRAWING

FIG. 2 is another block connection diagram showing the composition of another preferred embodiment of this invention.

FIG. 6 is a vector diagram for describing the operation of the preferred embodiment shown in FIG. 2.

Corresponding components are designated by the same reference symbols.

DESCRIPTION OF THE PREFERRED EMBODIMENT

According to a preferred embodiment of the present invention, a pilot signal source for generating signals of selected frequency is connected to the input of the transistor-to-be-measured (hereinafter to be referred to as transistor circuit) on which prescribed operating conditions are established. The signal appearing at the output of said transistor circuit is applied to the amplifier, the modulator, a circuit for selecting frequency components of specified frequency bands from the output signal of said modulator, rectifier and output meter. The amplifier includes therein a variable attenuator which can adjust the attenuation by means of electric signals and includes an automatic gain adjusting means which selects DC component out of the output signal of said modulator, compares it with the reference DC signal at the differential amplifier, and adjusts the attenuation of said variable attenuator according to the difference between the two signals.

Figure 1:
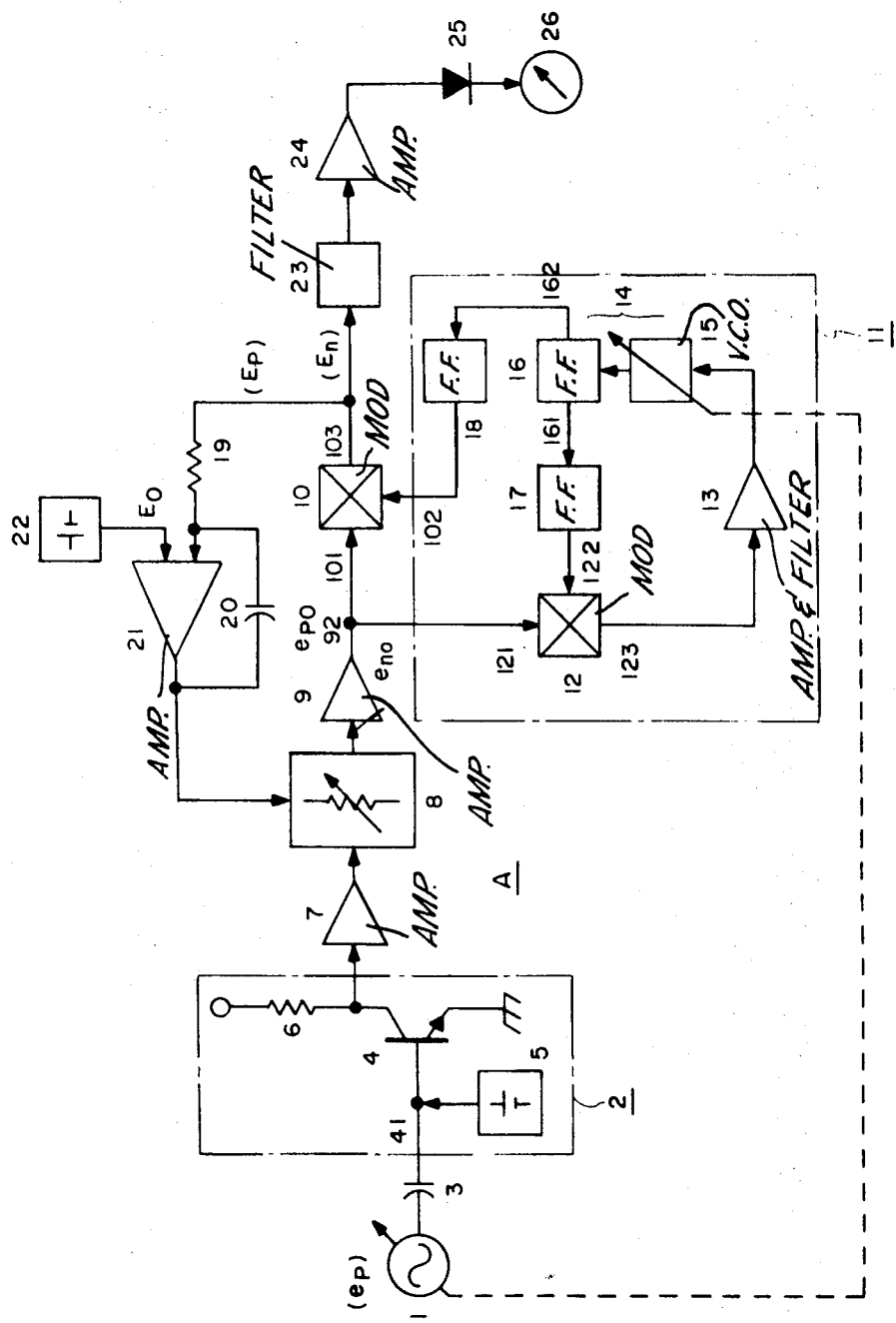
FIG. 1 is a block connection diagram showing the composition of a preferred embodiment of this invention.

Referring now to FIG. 1, there is shown a block connection diagram of a preferred embodiment of the present invention. In the drawing, pilot signal source 1 produces a signal of desired test frequency. The output level of this signal source is controlled at a constant level, and is applied to input 41 of transistor circuit 2 via coupling capacitor 3. Transistor circuit 2 includes transistor-to-be-measured 4, so that this circuit according to the diagram is one of emitter grounding circuit. 5 indicates a base-bias power source for transistor 4; 6 is a collector load resistor. Selected operating conditions are established on transistor 4. To the output of transistor circuit 2, i.e., collector of transistor 4, are connected in concatenation preamplifier 7, variable attenuator 8 and amplifier 9 in that order. The circuit from transistor circuit 2 to the output of amplifier 9 is an amplifier circuit for selective frequency signal, and it shall be referred to as amplifier circuit A hereinafter. The attenuation of variable attenuator 8 is controlled by the output DC signal of differential amplifier 21 to be described further on. The desired test frequency signal applied to input 41 of transistor circuit 2 from pilot signal source 1 is amplified by amplifier circuit A. At the same time, the noise generated at transistor circuit 2 is also amplified by the same amplifier circuit A and thus amplified signals of test frequency signal and noise are present at the output of said amplifier circuit A. The test frequency signal applied to this input 41 is to be represented by $e_p$, the input equivalent voltage of noise generated at transistor circuit 2 is represented by $e_n$, and the signal components corresponding to the two signals at the output 92 of amplifier 9 are represented by $e_{po}$ and $e_{no}$.

Phase lock circuit 11 is a circuit for obtaining a signal that phase-locks to test-frequency component $e_{po}$ contained in the signal produced at output 92 of amplifier 9. The output signal of amplifier 9 is applied to one input 121 of second modulator 12. To the other input 122 of this modulator 12 is applied a drive signal having the same frequency as frequency $F_p$ of the selective frequency signal by means of voltage control oscillator 15, flip-flop circuit (F.F. circuit) 16 and F.F. circuit 17. Modulator 12 is a so-called chopper type modulator wherein the signal-to-be-modulated given to one input 121 is interrupted at each half cycle of said signal by the drive signal applied to the other input 122, thereby producing an intermittent signal of the signal-to-be-modulated modulated at output 123. The output signal of this modulator 12 is amplified and filtered by filter-amplifier 13 and applied to oscillator 15 as a DC signal. Oscillator 15 is set to produce a signal having a frequency about four times that of selective frequency, $F_p$, and it is a voltage control oscillator whose frequency varies continuously and slightly according to the magnitude and the polarity of the DC signal impressed from amplifier 13. The output signal of oscillator 15 is applied to F.F. circuit 16 where its frequency is divided by two, and two rectangular wave signals with a phase difference of 180° to each other are produced at the two outputs 161 and 162. These two output signals are applied to two F.F. circuits 17 and 18. The frequency is again divided by two in F.F. circuits 17 and 18, so that the output signal of circuit 17 is applied as the drive signal of the second modulator 12 to its other input 122, and the output of circuit 18 is applied as the drive signal of the first modulator 10 to its other input 102. It should be noted here that the frequencies of the drive signal applied to the second input 122 of the second modulator 12 and the drive signal applied to the second input 102 of the first modulator 10 are nearly equal to test frequency $F_p$ before phaselock has been achieved and that their phase difference is 90°. The output 123 of the second modulator 12 is connected to the second input 122 of modulator 12 via the wave-filter amplifier 13, voltage control oscillator 15, F.F. circuits 16 and 17, thereby forming a phase lock loop. Therefore, the frequency and phase of oscillator 15 are automatically adjusted so as to bring the DC component contained in the output signal of the modulator 12 close to 0. Consequently, the frequency of the output signal of F.F. circuit 17 is identical with the selective frequency $F_p$ component of the output signal of amplifier 9, and its phase is phase-locked to the phase of the $F_p$ component at a phase difference of 90°.

Figure 3A:
FIGS. 3a–3c, 4a–4c, and 5a–5c indicate waveform diagrams for describing the operations of the phase lock circuit constituting part of the preferred embodiment of this invention shown in FIG. 1.
Figure 3B:
Figure 3C:
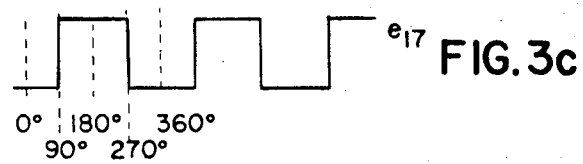
Figure 4A:
Figure 4B:
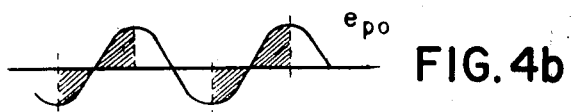
Figure 4C:
Figure 5A:
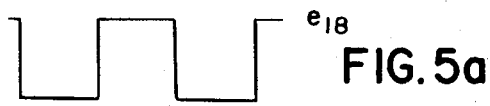
Figure 5B:
Figure 5C:

FIGS. 3, 4 and 5 are waveform diagrams for explaining operations of the phase lock circuit 11 and the first and second modulators. In reference to FIG. 3, waveform (a) indicates output wave $e_{15}$ of voltage-control oscillator 15 whose frequency should be $4F_p$. Waveforms (b) and (c) indicate output wave $e_{17}$ of F.F. circuit 17 and output wave $e_{18}$ of F.F. circuit 18. Both $e_{17}$ and $e_{18}$ have a frequency of $F_p$ and a phase difference of 90°. FIG. 4 indicates the relationship between the input and output waves of the second modulator 12 in a state where phase lock is maintained. But here the noise wave component contained in the input signal is neglected, and the input signal is indicated in waveform (e) as sine wave $e_{po}$ of frequency $F_p$. Waveform (d) indicates the drive signal $e_{17}$ applied to the second input 122. Modulator 12 is a gate circuit wherein the continuity between the first input and the output is interrupted during the positive half cycle of the drive signal $e_{17}$. Here, if the phase difference between $e_{po}$ and $e_{17}$ is 90°, the output signal wave occuring at output 123 would be represented by $e_{12}$, and in the $e_{po}$ wave, the shaded part within it would contribute to the DC component of the output signal. Therefore, if the phase difference between $e_{po}$ and $e_{17}$ is 90°, the DC component of the output signal $e_{12}$ would be 0, and $e_{po}$ and $e_{17}$ are phase locked at a phase difference of 90° by operation of the phase lock loop composed of the filter amplifier 13, local oscillator 14 and F.F. circuit 17. Thus, as shown in FIG. 5, in the first modulator 10 the $F_p$ component $e_{po}$ of the signal impressed on the first input 101 and drive signal $e_{18}$ applied to the second input are phase locked in the same phase, and thus therefore a half-wave rectified wave of $e_{po}$ is generated at output 103.

Now, assuming that the signal impressed on the input of the first modulator contains selective frequency component $e_{po}$ and noise component $e'_{no}$ having a frequency difference of $\Delta f$ therewith, the output signal of the first modulator would include DC component $E_p$ having a magnitude proportional to $e_{po}$ and component $E'_n$ proportional to noise component $e'_{no}$ at frequency $\Delta f$.

DC component $E_p$ contained in the output signal of said first modulator is detected by the filter circuit consisting of resistor 19 and capacitor 20, and is applied to the one input of differential amplifier 21. The reference DC signal $E_o$ of reference DC source 22 is impressed on the other input of differential amplifier 21; a DC signal corresponding to the difference between $E_p$ and $E_o$ will occur at the output of differential amplifier 21, and this signal will regulate the attenuation of variable attenuator 8, automatically regulating to keep DC component $E_p$ in the output signal of the first modulator always equal to the reference DC signal E. Consequently, the amplification of the signal of selective frequency $F_p$ from input 41 of transistor circuit 2 to the output of amplifier 9 is always maintained at a constant value.

Band pass filter 23 is for selecting specified frequency band component out of the noise component included in the output of the first modulator 10, and it has a narrow pass band with a low center frequency. A suitable width of such a pass band would be, for example, of the order of a few hertz. Thus, out of noise component $e_{no}$ contained in the output of amplifier 9 will be selectively detected the frequency component $E_n$ adjacent to selective frequency $F_p$. The output signal of band pass filter 23 is amplified by low frequency amplifier 24, rectified by rectifier 25, and read out at output indicator 26. As rectifier 25, one with square-law detection characteristics is suitable, but one with linear rectifying characteristics may also do.

In the present invention, assuming that $e_p$ represents the power of the test-frequency signal given to the input of transistor circuit 2, $e_n$ represents the power (converted to input) of frequency component near to this test frequency $F_p$ of the noise generated by transistor 4, $E_p$ represents the DC signal component corresponding to said $e_p$ contained in the output signal of the first modulator, and that $E_n$ represents the output corresponding to $e_n$, $$e_n = E_n \times e_p / E_p$$

Here, $e_p$ is constant, and $E_p$ is also regulated at a constant value by means of the reference DC signal, so that the indication of output indicator 26 will accurately represent $e_n$. In this device, the drive signal of the first modulator 10 will always be phase-locked to selective frequency signal component $e_{po}$ contained in the output signal of amplifier 9. Thus, notwithstanding a possible phase difference between the input and output of amplifier, the modulation efficiency ($E_p/e_{po}$) for this frequency component at modulator 10 will remain unchanged and will always maintain the maximum efficiency. Further, as amplifying rate $e_{po}/e_p$ for the signal of selective frequency $F_p$ from input 42 of transistor circuit 2 to the output of amplifier 9 is always constant irrespective of the change in the gains of transistor 4 etc., the transistor noise signal adjacent to selective frequency $F_p$ may be accurately read out from the indication of the output meter corresponding to $E_n$ regardless of selective frequency $F_p$.

FIG. 2 indicates another preferred embodiment of the present invention. In this embodiment two-phase signals directly related to the phase of output signal $e_p$ of the pilot signal are used as the drive signal for the first and second modulators as distinguished from the circuit of FIG. 1 in which the drive signal of the first modulator is a frequency signal phase-locked to selective frequency signal component $e_{po}$ of the output signal of amplifier 9. In order to compensate for the effect of change of modulating efficiency of the first modulator due to the phase lapse for $F_p$ of amplifier circuit A, the output signal component of the second modulator is vertically added to the output signal of the first modulator. In the figure, circuit 27 is a circuit for receiving selective frequency signal from the pilot signal source, and converting the phase into two signals having a frequency identical therewith, but having a phase difference of 90°. Thus the two output signals of this circuit 27 are applied to inputs 102 and 122 as the drive signal respectively for the first modulator 10' and the second modulator 12'. The output signal of the first modulator 10' is impressed on one input 281 of vector sum circuit 28 via smoothing circuit 104 which has a suitable time constant, and the output signal of the second modulator 12' is impressed on the other input 282 of vector sum circuit 28 via smoothing circuit 124. Smoothing circuits 104 and 124 also are similarly arranged. Vector sum circuit 28 is a circuit for producing at its output a signal proportional to $\sqrt{E_1^2 + E_2^2}$ (or simply to the sum of the squares of $E_1$ and $E_2$) where $E_1$ and $E_2$ represent the signals applied to the two inputs. Therefore, at its output will be produced, a signal which includes a DC component $E_p$ that corresponds to test frequency component $e_{po}$ included in the output signal of amplifier 9, and an AC component $E_n$ that corresponds to noise component $e_{no}$ of the frequency component adjacent to the test frequency $F_p$. Here, it is the same as with the preferred embodiment of FIG. 1 in that this DC component $E_p$ is applied to differential amplifier 21 and is utilized in the automatic gain control of the amplifier circuit, and the AC component $E_n$ is applied to the output meter via band pass filter 23 and is utilized in the indication of noise component of the transistor.

The operations of the first and the second modulators 10' and 12' and the vector sum circuit will now be described with reference to the vector diagram shown in FIG. 6. In order to simplify the description, let us ignore the noise component contained in the output signal of amplifier A. In the FIG., output signal $e_p$ of the pilot signal source is taken as reference vector and it is expressed as vector $e_p$. And the drive signal $e_1$ of the first modulator 10' is made equiphase with $e_p$ representing it as $e_1$. Also, drive signal $e_2$ of the second modulator is represented by $e_2$. Also, assuming that output signal $e_{po}$ of amplifier A has a phase difference of $\theta$ in relation to $e_p$, and denote it as $e_{po}$. Here, the amplitude of the DC component of output signal of the first modulator 10' will be proportional to the component $e_{po} \cdot \cos \theta$ of $e_{po}$ projected over the reference vector (i.e. $\overline{OE_1}$), the output signal of the second modulator 12' will be proportional to $e_{po} \sin \theta$ (i.e. $\overline{OE_2}$). Therefore, the output signal of vector sum circuit 28 will be proportional to the magnitude of $e_{po}$. In case noise component $e'_{no}$ of frequency $F_p+\Delta f$ is included in the output signal of amplifier A, a signal having an amplitude proportional to the amplitude of $e'_{no}$ at frequency $\Delta f$ will be included in the output signal of the vector sum circuit.

In the system of FIG. 2, a variable frequency two-phase oscillator which generates two selective frequency signals having a phase difference of 90° may be used as a pilot signal source so that the output signal of said one phase is used as the drive signal of one of the first and second modulators 10' and 12', and the output signal of the other phase is used as the drive signal for the other modulator.

In the preferred embodiments of FIGS. 1 and 2, the first and second modulators were described as chopper type modulators, but these modulators may be modulators of other suitable types. They may be of some other type as long as the frequencies of the drive signal of these two modulators are selective frequency $F_p$ and have a phase difference of 90°. Also, with additional filtering in the circuit of FIG. 1, the frequencies of the drive signals of the two modulators may be odd numericals subharmonic signals of $F_p$ such as one-third, one-fifth etc. of $F_p$. Here, the phase difference of the two signals would also change to one-third, one-fifth etc. of 90°.

We claim:

1. Transistor noise measuring apparatus comprising:
   transistor circuit means including input and output circuits disposed to connect to the base, emitter and collector electrodes of a transistor to be tested;
   a pilot signal source connected to the input circuit of said transistor circuit means for supplying a pilot signal of selected frequency thereto;
   amplifier means connected to the output circuit of said transistor circuit means and including a signal-controlled attenuator for altering signal transmission therethrough in response to an applied control signal;
   frequency-generating means connected to the output of said amplifier means for producing an output signal having a frequency proportional to said selected frequency component contained in the output of said amplifier means;
   mixer means having a first input connected to the output of said amplifier means and having a second input connected to the output of said frequency generating means for producing a resultant signal including a direct-current component and a fluctuating component at an output of the mixer means as the combination of signals applied to the inputs thereof;
   circuit means responsive to the direct-current component said said resultant signal for applying to said amplifier means a control signal representative of said direct-current component for maintaining a signal transmission through said amplifier means substantially constant as said selected frequency is altered; and
   means responsive to the fluctuating component of said resultant signal for producing an output indication of the transistor noise.

2. A transistor noise measuring apparatus as in claim 1 wherein:
   said frequency-generating means produces a pair of signals at said selected frequency having substantially constant phase angle separation therebetween;
   said mixer means includes first and second modulators each having an input connected to the output of said amplifier means and each having another input connected to receive respective ones of said pair of signals, each of the first and second modulators producing a resultant output signal as the combination of the signals applied to the inputs thereof;
   said circuit means includes a vector signal combining circuit having a pair of inputs connected to respond to the signals at the outputs of the first and second modulators for producing at an output thereof a signal having an amplitude proportional to the square root of the sum of the squares of signals applied to the inputs thereof; and
   said amplifier means is connected to respond to the direct-current component of the signal at the output of said vector signal combining circuit for maintaining the signal transmission therethrough substantially constant.

* * * * *

UNITED STATES PATENT OFFICE
CERTIFICATE OF CORRECTION

Patent No. 3,619,780  Dated November 9, 1971

Inventor(s) Bas Hoeks, Paul E. Stoft, Nobuo Numasaki, Haruo Ito, Takayuki Sato, and Knud Knudsen It is certified that error appears in the above-identified patent and that said Letters Patent are hereby corrected as shown below:

Column 4, line 28, "vertically" should read -- vectorially --; line 68, "$\theta$" should read -- $<\theta$ --; line 71, "$e_{po} \cos \theta$" should read -- $e_{po} \cdot \cos \theta$ --.

Signed and sealed this 9th day of May 1972.

(SEAL)
Attest:

EDWARD M. FLETCHER, JR.
Attesting Officer

ROBERT GOTTSCHALK
Commissioner of Patents